United States Patent Office 3,475,468
Patented Oct. 28, 1969

3,475,468
PROCESS FOR THE PREPARATION OF 17-SUB-STITUTED 13-ALKYLGONA-1,3,5(10),6,8- AND 1,3,5(10),8,14-PENTAENES
Reinhardt P. Stein, Conshohocken, Herchel Smith, Wayne, and Robert C. Smith, King of Prussia, Pa., assignors to American Home Products Corporation, New York, N.Y., a corporation of Delaware
No Drawing. Continuation-in-part of application Ser. No. 571,982, Aug. 12, 1966. This application June 22, 1967, Ser. No. 647,910
Int. Cl. C07c *167/14, 169/10;* A61k *17/06*
U.S. Cl. 260—397.45                                                       13 Claims

ABSTRACT OF THE DISCLOSURE 17-substituted-13-alkyl-gona - 1,3,5(10),6,8 - pentaenes (III) and -1,3,5(10),8,14-pentaenes (IV) are prepared by a process comprising epoxidizing the corresponding 17-substituted-13-alkylgona - 1,3,5(10),8 - tetraene (I) to form a 17-substituted-8,9-epoxido-13-alkylgona-1,3,5(10)-triene (II) and rearranging II to, and, in an optional step, isolating, a 17-substituted-8-hydroxy-13-alkylgona-1,3,5-(10),9(11)-tetraene (IIa), then eliminating the elements water from (IIa). Compounds (III), particularly equilenin, are useful estrogenic agents and compounds (IV) are convertible by selective hydrogenation back to starting materials (I).

---

This application is a continuation-in-part of Ser. No. 571,982, filed Aug. 12, 1966 and now abandoned.

This invention relates to a new and novel process of preparing epoxides of 17-substituted-gonatrienes and their subsequent conversion to 17-substituted 13-alkylgona-1,3,5(10),6,8- and -1,3,5(10),8,14-pentaenes including the optional isolation of a 17-substituted-13-alkyl-8ξ-hydroxy-gona-1,3,5(10),9(11)-tetraene. In particular the present invention is concerned with the preparation of therapeutically-useful steroid compounds known as 13-alkylgona - 1,3,5(10),6,8 - pentaenones and, particularly, equilenin.

The novel process of the present invention comprises the preparation of 17-substituted-13-alkyl-8,9-epoxygona-1,3,5(10)-trienes (II) and their conversion to 17-substituted-13-alkylgona-1,3,5(10),6,8-pentaenes (III) which have utility as estrogenic agents. The following schematic pathway illustrates this reaction:

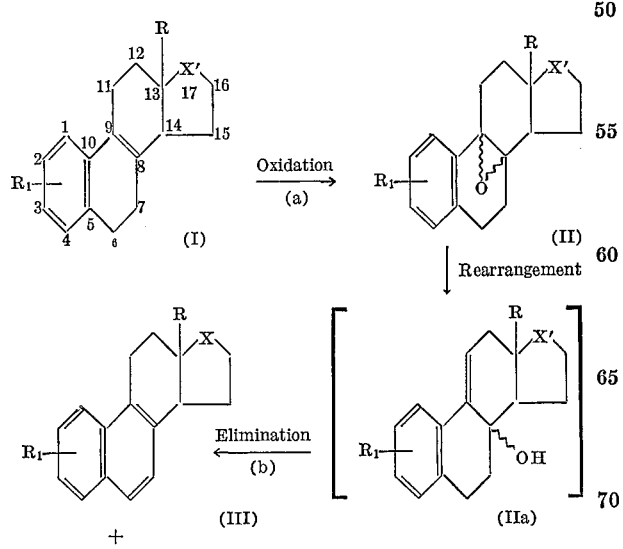

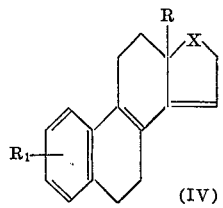

wherein R is lower alkyl; $R_1$ is hydrogen, hydroxy, lower alkoxy, lower alkyl, lower cycloalkyloxy or lower alkanoyloxy, X is keto, hydroxymethylene, lower alkoxymethylene or lower alkanoyloxymethylene, X' is keto, hydroxymethylene, lower alkoxymethylene, lower alkanolyoxymethylene or lower alkylenedioxymethylene and (ξ) indicates that the substituent is in the alpha or beta position. The brackets around Formula IIa indicate that it may be isolated, if desired. Under the conditions contemplated for step (b) a 17-ketal group will be cleaved to provide a 17-keto group.

In this specification and in the appended claims the term "lower alkyl" refers to alkyl groups having up to about 6 carbon atoms; the term "lower alkanoyloxy" refers to those groups derived from alkane carboxylic acids having up to about 6 carbon atoms, the terms "lower alkoxy" and "lower cycloalkyloxy" refers to those groups derived, by removal of a hydrogen atom, from alcohols open chain and cyclic, having up to 6 carbon atoms and the term lower alkylenedioxy refers to ketals, open chain and cyclic, of up to 6 carbon atoms. Illustrative lower alkoxy groups are methoxy, ethoxy, isopropoxy, tetrahydropyranyloxy, cyclopentyloxy and the like; suitable lower alkyl groups are methyl, ethyl, n-propyl, n-butyl and the like; illustrative lower alkanoyloxy groups are acetoxy, propionyloxy, butyroyloxy, and the like, and ilustrative lower alkylenedioxy groups are ethylene dioxy, propylenedioxy, and the like. Preferably group R is methyl, ethyl, n-propyl or n-butyl.

The instant invention in its broadest aspect contemplates, in essence: a process for the preparation of a gonapentaene steroid of the formula

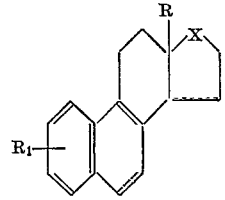

which contains a fifth double bond at either position indicated by the broken lines and wherein R is lower alkyl–$R_1$ is hydrogen, hydroxy, lower alkoxy, lower cycloalkoxy, lower alkyl or lower alkanoyloxy and X is keto, hydroxymethylene, lower alkoxymethylene or lower alkanoyloxy methylene which comprises:

(a) Reacting a tetraene steroid of the formula

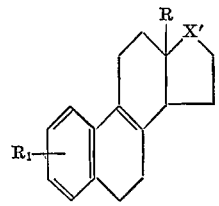

wherein R, $R_1$ and X' are defined as above, with an epoxidizing agent, such as a per-carboxylic acid, especially a per-acid selected from perphthalic acid, perbenzoic acid, metachloroperbenzoic acid, or peracetic acid, and the like, in a reaction inert organic solvent, such as, for example, a mixture consisting of a liquid alkane-benzene or a liquid alkane-toluene, preferably in the presence of a base, for example, sodium carbonate, potassium carbonate, sodium bicarbonate, potassium bicarbonate, and the like, said reaction being conducted at a temperature range from about —10° C. to about 10° C. for a period of from about five minutes to about two hours, to form an epoxidized steroid of the formula:

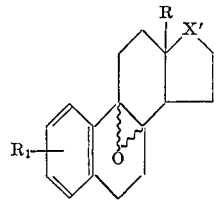

wherein R, R₁ and X' are defined as above, and (b) Reacting said epoxide with a mineral acid, in a reaction-inert organic solvent at a temperature of from about 20° C. to about 110° C. for a period of from about five minutes to about two hours.

Of course, as will be obvious to those skilled in the art, other groups such as illustrated for R₁ can be present at other positions in the steroid nucleus.

Two especially valuable embodiments comprise, respectively, processes as defined above wherein X in the starting material, intermediates and final products is carbonyl or hydroxymethylene.

An important embodiment of the instant invention is to carry out the process with starting materials wherein X is carbonyl, to isolate the product of step (b) and then to separate it by fractional crystallization into a gona-1,3,5(10),6,8-pentaen-17-one and a gona-1,3,5(10),8,14-pentaen-17-one. If this embodiments is employed with a starting material of Formula I wherein R₁ is 3-hydroxy, R is methyl and X is keto, there is provided the very valuable product equilenin, a compound of Formula III wherein R₁ is 3-hydroxy, R is methyl and X is keto.

A further valuable embodiment of the instant invention is a process as defined above wherein, in step (a), the per-acid employed is metachloroperbonzoic acid; the solvent mixture employed is hexane-benzene; and the base employed is selected from potassium carbonate or potassium bicarbonate; and, in step (b), the mineral acid employed is hydrochloric acid; and the reaction-inert organic solvent employed is an alkanol.

In addition, this invention contemplates among its embodiments a process as defined above for the preparation of 3-methoxy-13β-methylgona-1,3,5(10),6,8-pentaen-17-one and 3-methoxy-13β-methylgona-1,3,5(10),8,14-pentaen-17-one which comprises:

(a) Reacting 3 - methoxy-13β-methylgona-1,3,5(10),8-tetraen-17-one with metachloroperbenzoic acid, in a hexane-benzene solvent mixture, in the presence of potassium carbonate, said reaction being conducted at a temperature of about 0° C. for a period of about fifteen minutes, to form 8,9 - epoxy - 3-methoxy-13β-methylgona-1,3,5(10)-trien-17-one; and (b) Reacting said epoxide with hydrochloric acid in warm methanol for about one hour.

A further valuable embodiment of this invention is a process as defined above for the preparation of 13β-ethyl-3-methoxygona-1,3,5(10),6,8-pentaen-17-one and 13β-ethyl - 3 - methoxygona - 1,3,5(10),8,14 - pentaen-17-one which comprises:

(a) Reacting 13β - ethyl - 3-methoxygona-1,3,5(10),8-tetraen-17-one with metachloroperbenzoic acid, in a hexane-benzene solvent mixture, in the presence of potassium carbonate, said reaction being conducted at a temperature of 0° C. for a period of about fifteen minutes, to form 8,9-epoxy-13β-ethyl-3-methoxygona-1,3,5(10)-trien-17-one; and (b) Reacting said epoxide with hydrochloric acid in warm methanol for about one hour.

Still another valuable embodiment of this invention employs the process outlined above but includes isolating the 8-hydroxy steroid of Formula IIa hereinabove, then dehydrating it. This step is shown in the pathway above in brackets to indicate the optional isolation of the valuable intermediate of Formula IIa. This embodiment thus is a process as outlined above including the steps of treating the mixture from step (a) with a mild organic carboxylic acid such as, for example, benzoic acid, metachlorobenzoic acid, furoic acid, 2-chloro-5-nitrobenzoic acid, 2,4-dinitrobenzoic acid or an obvious chemical equivalent thereof to form a 8-hydroxy steroid of the formula

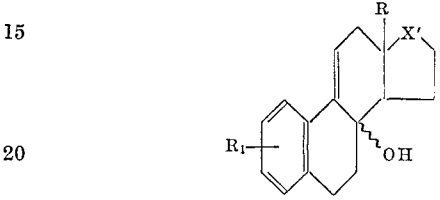

wherein R, R₁ and X' are as defined therein, isolating said 8-hydroxy steroid and then reacting it with a mineral acid according to step (b) hereinabove.

The process of this invention provides the valuable intermediates of Formula IIa: 8-hydroxy steroid compounds of the formula

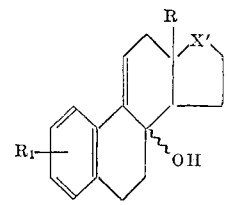

wherein R is lower alkyl, R₁ is hydrogen, hydroxy, lower alkoxy, lower cycloalkoxy, lower alkyl or lower alkanoyloxy and X' is keto, hydroxymethylene, lower alkoxymethylene, lower alkanoyloxymethylene or lower alklenedioxymethylene.

In one manner of carrying out the oxidation reaction, step (a) is effected by admixing an appropriate 17-substituted-13-alkyl-gona 1,3,5(10),8-tetraene (I) with a per-acid, preferably perphthalic acid, perbenzoic acid, metachloroperbenzoic acid, peracetic acid or an obvious chemical equivalent thereof, in a solvent mixture, conveniently a liquid alkane and benzene or toluene, which optionally and preferably, is made alkaline by the addition of an alkali metal carbonate or bicarbonate, at a temperature below 10° C. for a period of up to about two hours. Especially preferred is to carry out this reaction step with metachloroperbenzoic acid, in a hexene-benzene solvent mixture which is made alkaline with potassium carbonate, at about 0° C. for about fifteen minutes. After the oxidation reaction is complete, the resulting 17-substituted-13-alkyl-8,9-epoxygona-1,3,5(10)-triene (II) is obtained by conventional methods, such as, for example filtration, extraction of the filtrate with an immiscible organic solvent, concentration of the extract and recrystallization of the residue from a suitable solvent, such as a hot mixture of a liquid alkane and benzene or toluene.

With respect to step (b), rearrangement and elimination of the elements of water from the above prepared 17 - substituted-13-alkyl-8,9-epoxygona-1,3,5(10)-triene (II), this may be effected by heating said compound, in a reaction-inert organic solvent, in the presence of an acid such as a mineral acid at a temperature range of about 20° C. to about 110° C. for from about five minutes to about two hours. Preferably, this reaction is conducted in a lower alkanol, containing up to about 6 carbon atoms, especially methanol, with hydrochloric acid, at about 60° C. for a period of about fifteen minutes. When the process is complete, the two isomeric products, if X is keto, e.g., 13 - alkylgona-1,3,5(10),6,8-pentaen-17-one (III), and 13-alkylgona - 1,3,5,(10),8,14-pentaen-17-one (IV) may be separated by standard recovery procedures, e.g., fractional crystallization. Where X is other than keto, and if separation is substantially more difficult, it is then preferred to isolate the corresponding compound of Formula III as its 17-keto derivative by treating the mixture from step (b) with under strong oxidizing conditions, such as, for example, by dissolving it in acetone and treating the solution with 8 N chromic acid. This yields pure 13-alkyl-1,3,5(10),6,8-pentaen-17-ones because the 13-alkylgona-1,3,5(10),8,14-pentaen-17-ones are removed by nearly total oxidative destruction.

By reaction-inert organic solvent as employed herein is meant an organic solvent which dissolves the reactants and does not prevent or interfere with their interaction. Among the preferred solvents are alkanols, benzene, toluene, dioxane, chloroform and liquid alkanes, such as, hexane and octane. By mineral acid is meant any commerically available inorganic acid, for example, hydrochloric acid, hydrobromic acid, hydroiodic acid, sulfuric acid, phosphoric acid and nitric acid. The time and temperature ranges used in the aforementioned rearrangement and elimination reaction simply represent the most convenient ranges consistent with carrying out the reaction in a minimum of time without undue difficulty. Thus, reaction temperatures appreciably below these can be used, but their use considerably extends the reaction time. Similarly, reaction temperatures higher than those mentioned can be employed with a concomitant decrease in reaction time.

The 17 - substituted-13-alkylgona-1,3,5(10)-8-tetraene starting materials (Formula I) for the process of the present invention may be prepared by the process described by Douglas, Graves, Hartley, Hughes, McLoughlin, Siddall and Smith in J. Chem. Soc., 1963, pp. 5077–94. For example, 13-methyl-3-methoxygona-1,3,5(10),8-tetraen-17-ol or one can be prepared by hydrogenation of the corresponding gona-1,3,5(10),8,14-pentaene which itself can be obtained by cyclodehydration of the corresponding 8(14)-secogona-1,3,5(10)9(11)-tetraene - 14,-17-dione. Other compounds of Formula I can be prepared by entirely analogous procedures and, if required, the 17-alkoxymethylene group is introduced by conventional etherification procedures, or the 17-lower alkanoyloxymethylene group is introduced by esterification in a known manner, or a 17-alkylenedioxymethylene group is introduced by ketalization in a known manner.

The 17 - substituted - 13-alkylgona-1,3,5(10),6,8-pentaenes (III), especially the 13-alkylgona-1,3,5(10),6,8-pentaen-17-ols and -ones made by the process of this invention as indicated above, have estrogenic activity. This makes them useful to treat conditions in mammals responsive to treatment with estrogenic drugs. Among such conditions are, for example, menopause, senile vaginitis, kraurosis vulvae, pruritus vulvae and the like. They are also useful as intermediates for the preparation of other steroids with hormone and other activities. The isomeric 17-substituted-13-alkylgona - 1,3,5(10),8,14 - pentaenes (IV) can be easily reconverted by hydrogenation to 17-substituted-13-alkylgona - 1,3,5(10),8 - tetraene (I), the starting compounds of the process of this invention.

In the product of a total synthesis which has not included a suitable resolution stage the compounds of the invention, which have the 13β-configuration, will be present in equimolecular mixture or racemate form with the corresponding enantiomorphs.

The products of Formula III of this invention can be used in association with a pharmaceutically acceptable carrier. They can be formulated in liquid or solid forms, for instance as capsules, tablets, suppositories, powders, dispersable granules, cachets and the like by combining them wtih conventional carriers. Such conventional carries include magnesium carbonate or stearate, talc, sugar, lactose, pectin, dexdrin, starch, gelatin, tragacanth, methyl cellulose, sodium carboxymethyl cellulose, low melting wax and cocoa butter. Diluents, flavoring agents, solubilizers, lubricants, suspending agents, binders or tablet-disintegrating agents can be used. Powders or tablets preferably contain 5 or 10 to 99% of the active constituent. The active steroid can be formulated with an encapsulating material with or without other carriers.

Liquid preparations such as solutions, suspensions or emulsions can also be used. Such preparations include dispersions in a pharmaceutically acceptable carrier such as arachis oil or sterile water, preferably containing a non-ionic surface active agent such as fatty acid esters of polyhydroxy compounds, e.g. sorbitan, aqueous starch in sodium carboxymethyl cellulose solutions, aqueous propylene glycol or polyethylene glycol. Thus a water-propylene glycol solution can be used for parenteral injection and aqueous suspensions suitable for oral use can be made by utilizing natural or synthetic gums, resins, methyl cellulose or other well known suspending agents.

The compounds can be in unit dose form in which the dose unit is for instance from about 1 to about 200 mg. of each active steroid depending on the type of therapeutic desired. The unit dose form can be a packaged composition, e.g. packeted powder, vials or ampuls, or, for example, in the form of capsules, cachets or tablets or any number of these in packaged form. The pharmaceutical compositions can also consist substantially solely of the active steroid when this is in unit dose form.

Equilenin, one of the products prepared by the instant process, is useful at a level of 1.25 mg. daily, orally, in menopausal syndrome and from 1.25 to 3.75 mg. or more, daily, for senile vaginitis, kraurosis vulvae and pruritis vulvae, depending on the tissue response of the individual.

DESCRIPTION OF THE PREFERRED EMBODIMENTS

The following examples are given by way of illustration and are not to be construed as limitations of this invention, variations of which are possible without departing from the scope and spirit thereof.

EXAMPLE I

173 - methoxy - 13β-methylgona - 1,3,5(10),6,8-pentaen-17-one and 3 - methoxy - 13β - methylgona-1,3,5(10), 8,14-pentaen-17-one Potassium bicarbonate (2.9 g.) is added to hexant (98 ml.) and the suspension stirred at 0° C. To the suspension there is added simultaneously, a solution of 13β-methyl - 3-methoxygona - 1,3,5(10),8 - tetraen-17-one (4.0 g.) in benzene (35 ml.) and a suspension of metachloroperbenzoic acid (2.9 g.) in benzene (35 ml.) over a period of fifteen minutes. After complete addition of the reactants, stirring is continued for another fifteen minutes at 0° C. The resulting white precipitate is quickly filtered and the filtrate washed into a separatory funnel with either (75 ml.). The extract is washed with 5% sodium hydroxide (4× 125 ml.), with water, with a saturated sodium chloride solution, dried over anhydrous sodium sulfate, then filtered and the solvents removed in vacuo. The yellow gummy residue is dissolved in boiling hexane containing some benzene. This solution is filtered hot and the filtrate concentrated and allowed to stand. The resulting fine white crystalline suspension is filtered to give 1.4 g. of 8,9-epoxy - 3 - methoxy - 13β - methylgona - 1,3,5(10)-trien - 17 - one, M.P. 121–125° C., $$\lambda^{KBr}_{max.}\ 574\mu$$

The above prepared 8,9-epoxy-3-methoxy - 13β-methylgona - 1,2,5(10) - trien - 17 - one (0.40 g.) is dissolved by heating in methanol (20 ml.) to about 50° C. Concentrated hydrochloric acid (a total of 1.5 ml.) is added dropwise to the heated solution over a period of 15 minutes and the solution is allowed to cool with concomittant scratching to produce crystallization. The resulting purple crystalline solid is filtered to give 0.125 g. of 3 - methoxy - 13β - methylgona - 1,3,5(10),6,8-pentaen-17-one, M.P. 181–184° C.;

$\lambda_{max.}^{KBr}$ 5.75μ; $\lambda_{max.}^{EtOH}$ 231, 268, 278, 289, 322 mμ (ε 53,700; 4,570; 5,700; 4,700; and 4,000 respectively)

Calcd. for $C_{19}H_{20}O_2$; C, 81.39; H, 7.19. Found: C, 81.39; H, 6.90.

Another sample of the above prepared 8,9-epoxy-3-methoxy - 13β - methyl - 1,3,5(10) - trien - 17 - one. (1.0 g.) is dissolved by heating in methanol (25 ml.). Concentrated hydrochloride acid (a total of 3.0 ml.) is added dropwise to the heated solution and continued warming and scratching initiates crystallization. The solution is allowed to cool and the solid filtered to yield 0.38 g. of 3-methoxy - 13β - methylgona - 1,3,5(10),6,8-pentaen - 17 - one as a pink crystalline powder; M.P. 180–183° C. A second crop is filtered from the above mother liquor to give 0.20 g. of 3 -methoxy - 13β - methylgona - 1,3,5(10),8,14 - pentaen - 17 - one, as a purple crystalline powder; M.P. 105–110° C.

Similarly, reacting 3 - propoxy -13β - propylgona-1,3,5(10),8-tetraen - 17-one with metachloroperbenzoic acid, there is obtained 8,9 - epoxy - 3 - propoxy - 13β-propylgona - 1,3,5(10) - trien - 17 - one. Contacting this product with hydroiodic acid yields both 3 - propoxy-13β - propylgona - 1,3,5(10),6,8 - pentaen - 17 - one and 3 - propoxy - 13β - propylgona - 1,3,5(10),8,14-pentaen-17-one.

EXAMPLE II

13β - methylgona - 1,3,5(10),6,8 - pentaen - 17 - one and 13β - methylgona - 1,3,5(10),-8,14 - pentaen-17-one Sodium biarbonate (3.0 g.) is added to heptane (100 ml.) and the suspension stirred at 5° C. To the stirring suspension, there is added a solution of 13β - methylgona - 1,3,5(10),8 - tetraen - 17 - one (4.0 g.) in benzene (35 ml.) and a suspension of perbenozic acid (3.0 g.) in benzene (35 ml.) over a period of thirty minutes. After complete addition of the reactants, stirring is continued for five minutes longer at 5° C. The resulting precipitate is filtered and washed into a separatory funnel with ethyl acetate (75 ml.). The extract is washed with 3% potassium hydroxide (4× 125 ml.), with water and with saturated potassium chloride solution then dried over anhydrous sodium sulfate. The extract is thereafter filtered and the solvents removed in vacuo. The residue is dissolved in boiling heptane containing some toluene and the solution is filtered hot, the filtrate concentrated and allowed to stand. The resulting crystalline suspension is filtered to give 8,9 - epoxy - 13β - methylgona - 1,3,5(10) - trien - 17 - one.

The above prepared 8,9 - epoxy - 13β - methylgona-1,3,5(10) - trien - 17 - one (0.5 g.) is dissolved in boiling ethanol (12.5 ml.) and admixed with dilute sulfuric acid (1.5 ml.) by dropwise addition of the acid. The solution is allowed to cool and the resulting precipitate filtered to obtain 13β - methylgona - 1,3,5(10),6,8-pentaen-17-one. On standing 13β - methylgona - 1,3,5(10), 8-14 - pentaen - 17 - one precipitates from the filtrate and is separated by filtration.

In the same manner, there is produced 8,9 - epoxy-2-ethoxy - 13β - methylgona - 1,3,5(10) - trien - 17 - one which is further reacted to produce 2-ethoxy-13β-methylgona - 1,3,5(10),6,8 - pentaen - 17 - one and 2-ethoxy-13β - methylgona - 1,3,5(10),8,14 - pentaen - 17 - one.

EXAMPLE III 2,13β-diethylgona-1,3,5(10),6,8-pentaen-17-one and 2,13β-diethylgona-1,3,5(10),8,14-pentaen-17-one Sodium carbonate (6.0 g.) is added to octane (200 ml.) and the suspension stirred at 10° C. To the suspension is added, a solution of 2,13β - diethylgona - 1,3,5(10),8-tetraen-17-one. (8.0 g.) in toluene (70 ml.) and a suspension of perbenboic acid (6.0 g.) in toluene (70 ml.) over a period of thirty minutes. After complete addition of the reactants, stirring is continued for five minutes longer at 10° C. The resulting precipitate is removed by filtration and the filtrate washed into a separatory funnel with diethyl ether (150 ml.). The extract is washed with 10% sodium hydroxide (4× 250 ml.), with water and with saturated sodium bromide solution then dried over anhydrous sodium sulfate. The extract is then filtered and the solvents removed in vacuo. The residue is dissolved in boiling octane containing some toluene, filtered hot, concentrated and allowed to stand. The resulting fine crystalline precipitate is filtered to obtain 8,9 - epoxy - 2,13β - diethylgona - 1,3,5(10) - trien-17-one.

The above prepared 8,9-epoxy-2,13β-diethylgona-1,3,5-(10)-trien-17-one (1.5 g.) is dissolved in isopropyl alcohol and slowly admixed with 2 N phosphoric acid (25 ml.) at 20° C. for two hours. Thereafter, the precipitated 2,13β-diethylgona-1,3,5(10),6,8-pentaen-17-one is separated by filtration. The filtrate is allowed to stand overnight and, thereafter, the precipitated 2,13β-diethylgona-1,3,5(10),8,14-pentaen-17-one is also separated by filtration.

EXAMPLE IV

13β-ethyl-3-methoxygona-1,3,5(10),6,8-pentaen - 17 - one and 13β-ethyl-3-methoxygona-1,3,5(10),8,14-pentaen-17-one Potassium bicarbonate (2 g.) is added to hexane (70 ml.) and the suspension stirred at 0° C. To the suspension is added simultaneously, a solution of 13β-ethyl-3-methoxygona-1,3,5(10),8-tetraen-17-one (3.00 g.) in benzene (25 ml.) and a suspension of metachloroperbenzoic acid (2.0 g.) in benzene (25 ml.) over a period of fifteen minutes. After complete addition of the reactants, stirring is continued for another fifteen minutes longer at 0° C. The resulting white precipitate is quickly filtered. The filtrate is washed into a separatory funnel with ether, the extract is washed well with 5% sodium hydroxide, with water, with saturated sodium chloride solution and then dried over anhydrous sodium sulfate. The extract is filtered and the solvents removed in vacuo to give a white crystalline solid. The solid is taken up in boiling hexane containing a few drops of benzene and filtered hot. The filtrate is boiled to bring all solids back into solution and allowed to stand at room temperature to complete crystallization. The resulting colorless plates are filtered to give 2.18 g. of 8,9 - epoxy-13β-ethyl-3-methoxygona-1,3,5(10)-trien-17-one; M.P. 125.5–127.0° C.;

$\lambda_{max.}^{KBr}$ 5.79μ; $\lambda_{max.}^{EtOH}$ 237, 277 and 286μ (ε=13,000, 1,600, and 1,600 respectively)

Calcd. for $C_{20}H_{24}O_3$: C, 76.89; H, 7.74. Found: C, 77.18; H, 7.61.

The above prepared 8,9-epoxy-13β-ethyl-3-methoxygona-1,3,5(10)-trien-17-one (0.250 g.) is dissolved by warming in methanol (5 ml.) and concentrated hydrochloric acid (10 drops) is added thereto. The solution is swirled at room temperature and as it cools, it becomes cloudy. The cloudiness is removed by the addition of a few drops of ether and the swirling continued until a crystalline precipitate begins to form. The mixture is allowed to stand to complete crystallization. The resulting off-white crystalline product is filtered to give 0.140 g. of the crude product; M.P. 160–170° C. The product is further purified by trituration and washing with cold ether to give 0.110 g.; M.P. 171–174° C. The product is then dissolved in methylene chloride and the solvent replaced with absolute ethanol by boiling. On standing at room temperature, pure 13β-ethyl-3-methoxygona-1,3,5(10),6-- 8-pentaen-17-one is quantitatively deposited as slightly violet prisms; M.P. 178–180° C., $\lambda_{max.}^{KBr}$ 5.79μ; $\lambda_{max.}^{EtOH}$ 232, 267, 278, 289, 322 and 338 mμ (ε 61,800; 4,830; 5,230; 3,620; 2,010; and 2,410 respectively)

The filtrate from the reaction mixture above deposits a second crop (0.080 g.) identified as 13β-ethyl-3-methoxygona-1,3,5(10),8,14-pentaen-17-one; M.P. 80–85° C.;

$\lambda_{max.}^{KBr}$ 5.79μ; $\lambda_{max.}^{EtOH}$ 312 mμ (ε 27,000)

Similarly, 8,9-epoxy-13β-ethyl-3-methylgona-1,3,5(10)-trien-17-one is produced and then converted to 13β-ethyl-3-methylgona-1,3,5(10),6,8-pentaen - 17 - one and 13β-ethyl-3-methylgona-1,3,5(10),8,14-pentaen-17-one.

EXAMPLE V

13β - ethyl - 3 - isopropoxygona - 1,3,5(10),6,8 - pentaen-17 - one and 13β-ethyl-3-isopropoxygona-1,3,5(10),-8,14-pentaen-17-one Potassium bicarbonate (1.0 g.) is added to hexane (35 ml.) and the suspension stirred at —5° C. To the suspension there is added simultaneously a solution of 13β-ethyl-3-isopropoxygona - 1,3,5(10),8-tetraen-17-one (1.3 g.) in benzene (12 ml.) and a suspension of m-chloroperbenzoic acid (0.9 g.) in benzene (12 ml.) over a period of thirty minutes. After complete addition of the reactants, stirring is continued for five minutes longer at —5° C. The resulting precipitate is quickly filtered and the filtrate washed into a separatory funnel with dimethyl ether (25 ml.). The extract is washed with 5% sodium hydroxide (4× 40 ml.), with water, with saturated sodium chloride solution and then dried over anhydrous sodium sulfate. The extract is filtered and the solvents removed in vacuo. The residue is dissolved in a boiling hexane-benzene mixture and the solution filtered hot. Thereafter, the filtrate is concentrated and allowed to stand. The resulting fine crystalline suspension is filtered to give 8,9-epoxy-13β-ethyl-3-isopropoxygona-1,3,5(10)-trien-17-one.

The above prepared epoxide (0.10 g.) is admixed with propanol and concentrated hydrochloric acid (3 drops) and the mixture is refluxed for one-half hour. The solvent is then swirled at room temperature and gradually becomes cloudy. The swirling is continued until a crystalline precipitate begins to form. The mixture is then allowed to stand until crystallization is complete. The product is then dissolved in methylene chloride and the solvent replaced with absolute ethanol by boiling. On standing at room temperature, pure 13β-ethyl-3-isopropoxygona-1,3,5(10),6,8-pentaen-17-one is deposited.

The filtrate from the reaction mixture above deposits a second crop identified as 13β-ethyl-3-isopropoxygona-1,3,5(10),8,14-pentaen-17-one.

EXAMPLE VI 3,13β-dibutylgona-1,3,5(10),6,8-pentaen-17-one and 3,13-dibutylgona-1,3,5(10),8,14-pentaen-17-one Potassium carbonate (2.9 g.) is added to nonane (98 ml.) and the suspension stirred at —10° C. To the suspension is added simultaneously, a solution of 3,13β-dibutylgona-1,3,5(10),8-tetraen-17-one (4.0 g.) in toluene (35 ml.) and a suspension of perbenzoic acid (2.9 g.) in toluene (35 ml.) over a period of fifteen minutes. After complete addition of the reactants, stirring is continued for ninety minutes longer at —10° C. The resulting precipitate is filtered and the filtrate washed into a separatory funnel with ether (75 ml). The extract is washed with 5% sodium hydroxide (4× 125 ml.), with water, with saturated sodium chloride solution and then dried over anhydrous sodium sulfate. The extract is filtered nad the solvents removed in vacuo. The residue is dissolved in boiling hexane containing some benzene. The resultnig solution is filtered hot and the filtrate concentrated and allowed to stand. The resulting fine crystalline suspension is filtered to give 3,13β-dibutyl-8,9-epoxygona-1,3,5(10)-trien-17-one. The above prepared epoxide (1.0 g.) is dissolved hot in butanol (25 ml.). Concentrated hydrochloric acid (a total of 3.0 ml.) is added dropwise to the heated solution (about 70° C.) and continued warming and scratching initiates crystallization. The solution is then allowed to cool and the solid filtered to give 3,13β-dibutylgona-1,3,5(10),6,8-pentaen-17-one as a crystalline powder.

A second crop is filtered from the above mother liquor to give 3,13β-dibutylgona-1,3,5(10),8,14-pentaen-17-one.

Similarly, 8,9-epoxy-13β-methyl - 3 - propylgona-1,3,5-(10)-triene-17-one is produced and converted to 13β-methyl-3-propylgona - 1,3,5(10),6,8-pentaen-17-one and 13β-methyl-3-propylgona-1,3,5(10),8,14-pentaen-17-one.

EXAMPLE VII 3-methoxy-13β-methylgona-1,3,5(10),6,8-pentaen-17-one and 3 - methoxy - 13β - methylgona - 1,3,5(10),8,14-pentaen-17-one To a solution of 3-methoxy-13β-methylgona-1,3,5-(10),8-tetraen-17-one (28.0 g.) in benzene (550 ml.) and hexane (150 ml.) is added, potassium carbonate (28.0 g.). The mixture is stirred at 0° C., then solid metachloroperbenzoic acid (19.0 g.) is added over a period of five minutes. The reaction is stired an additional 10 minutes at 0° C., then 5% potassium carbonate solution (500 ml.) is added and the reaction stirred for ten minutes more as it was allowed to warm up to room temperature. The mixture is separated and the organic layer is diluted with ethyl acetate and washed well with 5% sodium hydroxide solution, with water and with saturated sodium chloride solution. The extract is dried over anhydrous sodium sulfate, then filtered and the solvents removed in vacuo. The resulting oil is boiled with ether then set aside to allow complete crystallization. The resulting white crystalline material is filtered to give 24.5 g. of slightly impure 8,9-epoxy-3-methoxy-13β-methylgona-1,3,5(10)-trien-17-one, M.P. 132–136° C.;

$\lambda_{max.}^{KBr}$ 5.74

A sample of the above prepared epoxide (1.0 g.) is dissolved by warming in methanol (10 ml.). Concentrated hydrochloric acid (10 drops) is added to the warm solution and the reaction mixture is swirled and allowed to cool to room temperature for about one hour. Scratching the flask with a glass rod produces tiny needles. The product is filtered to give 0.48 g. of 3 - methoxy - 13β - methylgona - 1,3,5(10),6,8 - pentaen-17-one; M.P. 170–175° C. I.R. and UV spectra are identical with the same compound described in Example I. A second crop, 0.27 g. is then filtered; M.P. 95–100° C.; I.R. and UV spectra identical to a sample of 3 - methoxy - 13β - methylgona - 1,3,5(10),8,14 - pentaen-17-one.

EXAMPLE VIII

13β-ethyl-3-methoxygona-1,3,5(10),6,8 - pentaen - 17-one and 13β-ethyl-3-methoxygona-1,3,5(10),8,14-pentaen-17-one To a solution of 13β-ethyl-3-methoxygona-1,3,5(10),8-tetraen-17-one (24.0 g.) in benzene (500 ml.) and hexane (140 ml.) is added, potassium carbonate (24.0 g.). The mixture is stirred at 0° C., then solid metachloroperbenzoic acid (16.0 g.) is added over five minutes. The reaction mixture is stirred an additional ten minutes at 0° C., then 5% potassium carbonate solution (500 ml.) is added and the reaction stirred for ten minutes more as it is allowed to warm up to room temperature. The mixture is separated and the organic layer diluted with ethyl acetate and washed well with 5% sodium hydroxide solution, with water and with saturated sodium chloride solution. The extract is dried over anhydrous sodium sulfate, filtered and the solvents removed in vacuo. The resulting oil is boiled with ether then set aside to allow complete crystallization. The resulting white crystals are filtered to give 15.0 g. of 8,9-epoxy-13β-ethyl-3-methoxygona-1,3,5(10)-trien-17-one, M.P. 120–125° C., having I.R. and UV spectral data identical to the sample described in Example IV.

A sample of the above prepared epoxide (1.0 g.) is dissolved by warming in methanol (10 ml.), then concentrated hydrochloric acid (10 drops) is added to the warm solution. The reaction mixture is swirled, allowed to cool to room temperature and scratching the flask with a glass rod produces tiny needles. The product is filtered to give 13β-ethyl-3-methoxygona-1,3,5(10),6,8-pentaen-17-one. A second crop is filtered to obtain 13β-ethyl-3-methoxygona-1,3,5(10),8,14-pentaen-17-one.

EXAMPLE IX

Employing the general procedure described in Examples I–VIII, the following 13-alkylgona-1,3,5(10),8-tetraen-17-ones (I) are oxidized to the corresponding 13-alkyl-8,9-epoxygona-1,3,5(10)-trien-17-ones (II) which are then converted by mineral acid treatment to the hereinafter listed isomeric mixtures which consist of a 13-alkylgona-1,3,5(10),6,8-pentaen-17-one (III) and a 13-alkylgona-1,3,5(10),8,14-pentaen-17-one (IV):

| Starting Material (I) | Epoxide (II) | Products III, IV |
|---|---|---|
| 3-hydroxy-13β-methyl-gona 1,3,5,(10),8-tetraen-17-one. | 8,9-expoxy-3-hydroxy-13β-methylgona-1,3,5,(10)-trien-17-one. | 3-hydorxy-13β-methyl-1,3,5,(10),6,8-pentaen-17-one and 3-hydroxy-13β-methyl-gona-1,3,5(10),8,14,-pentaen-17-one. |
| 13β-ethyl-2-hydroxygona-1,3,5(10),8-tetraen-17-one. | 8,9-epoxy-13β-ethyl-2-hydroxygona-1,3,5(10)-trien-17-one. | 13β-ethyl-2-hydroxy-gona 1,3,5(10),6,8-pentaen-17-one and 13β-ethyl-2-hydroxygona-1,3,5(10,8,14-pentaen-17-one. |
| 3-hydroxy-13β-methyl-gona 1,3,5(10),8-tetraen-17-one, acetate. | 8,9-epoxy-3-hydroxy-13β-methylgona-1.3,5(10)-trien-17-one, acetate. | 3-hydroxy-13β-methyl-gona-1,3,5(10),6,8-pentaen-17-one, acetate and 3-hydroxy-13β-methylgona-1,3,5-(10),8,14-pentaen-17-one, acetate. |
| 1-hydroxy-13β-methyl-gona-1, 3, 5(10), 8-tetraen-17-one, butyrate. | 8,9-epoxy-1-hydroxy-13β-methylgona-I, 3, 5(10)-trien-17-one, butyrate. | 1-hydroxy-13β-methyl-gona 1, 3, 5(10), 6, 8-pentaen-17-one, butyrate and 1-hydroxy-13β-methylgona-1, 3, 5(10), 8, 14-pentaen-17-one, butyrate. |
| 13β-ethyl-3-hydroxygona-1, 3, 5(10), 8-tetraen-17-one, propionate. | 8, 9-epoxy-13β-ethyl-3-hydroxygona-1, 3, 5(10)-trien-17-one, propionate. | 13β-ethyl-3-hydroxygona-1, 3, 5(10), 6, 8-pentaen-17-one, propionate and 13β-ethyl-3-hydroxygona-1, 3, 5(10), 8, 14-pentaen-17-one, propionate. |
| 13β-ethyl-3-cyclopentyloxygona-1, 3, 5(10), 8-tetraen-17-one. | 8, 9-epoxy-13β-ethyl-3-cyclopentyloxygona-1, 3, 5(10) trien-17-one. | 13β-ethyl-3-cyclopentyloxygona-1, 3, 5(10),-6, 8-pentaen-17-one and 13β-ethyl-3-cyclopentyl-oxygona-1, 3, 5-(10), 8, 14-pentaen-17-one. |

EXAMPLE X dl-3-methoxy-13-methylgona-1,3,-5(10),9(11)-tetraene-8,17β-diol dl-3-methoxy-13-methylgona-1,3,5(10),8-tetraen-17β-ol, 9.0 g., is dissolved in 250 ml. of benzene and 25 ml. of hexane and cooled with an ice bath. Potassium carbonate, 9.0 g., and 6.0 g. of m-chloroperbenzoic acid are added to the stirred, cooled mixture and stirring is continued for 15 minutes. To the solution is added 250 ml. of 5% potassium carbonate solution, stirring is continued for 15 minutes at room temperature, then the layers are separated. The organic layer is diluted with ethyl acetate, washed with 5% sodium hydroxide solution, water and saturated sodium chloride solution then dried over anhydrous sodium sulfate. The extract is filtered and the solvents removed in vacuo. The resulting oil is dissolved in boiling ether, cooled and let stand to crystallize. The resulting fine white crystalline solid is filtered to obtain 5.57 g. of the crude product contaminated with dl-3-methoxy-8,9-epoxy-13-methylgona-1,3, 5(10)-trien-17β-ol. A sample, 4.00 g. is further purified by dissolving it in 100 ml. of chloroform containing 3.0 g. of benzoic acid. The solution is stirred overnight then the chloroform removed in vacuo. The residue is dissolved in ethyl acetate and the extract washed with 5% potassium carbonate solution, with water and with saturated sodium chloride solution and the extract dried over sodium sulfate. The solution is filtered and the solvent removed in vacuo. The oil is dissolved in boiling ether then let stand to crystallize. The resulting colorless prisms are filtered to obtain 3.43 g. of the pure product; M.P. 176–178° C.;

$\lambda_{max.}^{KBr}$ 290 and 3.07$\mu$; $\lambda_{max.}^{EtOH}$ 259 m$\mu$ ($\epsilon$ 18,000)

Calcd. for $C_{19}H_{24}O_3$: C, 75.97; H, 8.05. Found: C, 75.66; H, 8.04.

EXAMPLE XI dl - 3 - methoxy - 13 - methylgona - 1,3,5 - (10),6,8 - pentaen-17$\beta$-ol and dl-3-methoxy-13-methylgona-1,3,5(10), 8-14-pentaen-17$\beta$-ol dl- 3- methoxy- 13- methylgona- 1,3,5(10),9(11)- tetraene-8,17$\beta$1-diol 4.00 g., is dissolved in boiling methanol (50 ml.) then 15 ml. of 18% of hydrochloric acid is added. Boiling is continued for 5 minutes, the solution allowed to cool and the resulting solid is filtered to obtain 1.67 g. of the mixture of products; M.P. 162–168°.

EXAMPLE XII dl - 3 - methoxy - 13 - methylgona - 1,3,5(10),6,8-pentaen-17-one A mixture of dl-3-methoxy-13-methylgona-1,3,5(10),6,8-pentaen-17$\beta$-ol and dl-3-methoxy-13-methylgona-1,3,5-(10),8,14-pentaen-17$\beta$-ol, 1.60 g., is dissolved in 100 ml. of acetone and solid sodium sulfate is added. With stirring 8 N chromic acid solution is added dropwise until a permanent red color is obtained. The excess oxidant is destroyed by the addition of isopropanol to obtain a green solution. Water is added and the mixture extraced with ethyl acetate. The extract is washed with saturated sodium bicorbonate solution, water and saturated sodium chloride solution then dried over anhydrous sodium sulfate. The solution is filtered and the solvent removed in vacuo. The orange solid is triturated with 95% ethanol and filtered to obtain 0.64 g. of crude product. The solid is dissolved in benzene and passed through a column of 10% silver nitrate impregnated alumina (neutral grade I). The column is eluted with beneze, and the solvent removed in vacuo. The residue in methylene chloride is treated with Nuchar charcoal and filtered through super cel. The solvent is replaced with absolute ethanol by boiling and allowed to stand to deposit 0.35 g. of the pure product as colorless prisms; M.P. 190–192° C.;

$\lambda_{max.}^{KBr}$ 5.79$\mu$; $\lambda_{max.}^{EtOH}$ 230, 267, 277, 288, 321 and 336 m$\mu$ ($\epsilon$ 49,500; 4,770; 5,250; 3,550; 1,900; 2,380)

Calcd. for $C_{19}H_{20}O_2$: C, 81.39; H, 7.19; Found: C, 81.72; H, 6.86.

EXAMPLE XIII dl-8,9-epoxy-3-methoxy-13-ethylgona-1,3,5(10)-trien-17$\beta$-ol.

dl - 3 - methoxy - 13 - ethylgona - 1,3,5(10),8 - tetraen-17$\beta$-ol, 50.0 g., is dissolved in 600 ml. of benzene and 150 ml. of hexane and cooled in an ice-bath. Potassium carbonate, 50.0 g., and 40.0 g. of m-chloroperbenzoic acid are added and the solution is stirred for six minutes. The reaction is quickly quenched by the addition of 600 ml. 5% potassium carbonate solution, stirred a few minutes at room temperature then the layers are separated. The organic layer is diluted with ethyl acetate, the extract is washed with 5% sodium hydroxide solution, water and with saturated sodium chloride solution then dried over anhydrous sodium sulfate. The solution is filtered and the solvents removed in vacuo. The residue is dissolved in ether and let stand to give 10.45 g. of product as a white crystalline solid; M.P. 130–134° C.;

$\lambda_{max.}^{KBr}$ 2.98$\mu$; $\lambda_{max.}^{EtOH}$ 235 m$\mu$ ($\epsilon$ 10,700)

EXAMPLE XIV dl-8,9-epoxy-3-methoxy-13-ethylgona-1,3,5(10)-trien-17-ol dl- 8,9- epoxy- 3- methoxy- 13- ethylgona- 1,3,5(10)-trien-17-one, 1.82 g., is stirred with 100 ml. of methanol and excess sodium borohydride (over 2.0 g.) is added in small portions over 2 hours. Water is added to completely precipitate a white crystalline solid which is filtered and dried to give 1.64 g. of the pure product; M.P. 164–167° C.;

$\lambda_{max.}^{KBr}$ 2.92$\mu$; $\lambda_{max.}^{EtOH}$ 235 m$\mu$ ($\epsilon$ 13,000)

Calcd. for $C_{20}H_{26}O_3$: C, 76.40; H, 8.34. Found: C, 76.13; H, 8.08.

EXAMPLE XV dl-3-methoxy-13-ethylgona-1,3,-5(10),6,8-pentaen-17-one dl - 8,9 - epoxy - 3 - methoxy-13-ethylgona-1,3,5(10)-trien-17$\beta$-ol, 9.2 g., is dissolved in 75 ml. of boiling methanol then 15 ml. of 18% hydrochloric acid is added. Boiling is continued for 5 minutes then the solution is cooled and diluted with water. The resulting mixture is extracted into ether. The extract is washed with saturated sodium bicarbonate solution, water and with saturated sodium chloride solution then dried over anhydrous sodium sulfate. The extract is filtered, the solvents removed in vacuo and the resulting oil dissolved in 200 ml. of acetone. To the stirred solution is added 8 N chromic acid dropwise until the permanent red color indicates completion of the reaction. The mixture is stirred for one hour more at room temperature then the excess oxidant is decomposed by the addition of 30 ml. of isopropanol. Water (one liter) is added and the mixture is extracted with ether. The extract is washed with saturated sodium bicarbonate solution, with water and with saturated sodium chloride solution then dried over anhydrous sodium sulfate. The filtered solution is evaporated in vacuo and the residue triturated with 95% ethanol and stored at 10° to complete crystallization. The crude product is filtered to give 1.60 g. of red crystalline solid. The solid is further purified by dissolving in benzene and passing the solution through a column of 10% silver nitrate impregnated alumina (neutral, grade I). The benzene eluant, is evaporated in vacuo and the residue in methylene chloride treated with decolorizing charcoal. The solution is filtered through filter aid and the methylene chloride replaced with absolute ethanol by boiling. The cooled solution is allowed to stand to fully crystallize. The pure product is filtered to give 1.11 g.; M.P. 179–180° C.;

$\lambda_{max.}^{KBr}$ 5.77$\mu$; $\lambda_{max.}^{EtOH}$ 230, 267, 277, 288, 320 and 336 m$\mu$ ($\epsilon$ 59,200; 4,750; 5,000; 3,420; 1,820; 2,300)

Calcd. for $C_{20}H_{22}O_2$: C, 81.60; H, 7.53. Found: C, 81.28; H, 7.70.

EXAMPLE XVI d-3-methoxy-13-methylgona-1,3,5-(10),9,(11)-tetraene-8-17$\beta$-diol d(-)-3 - methoxy - 13-methylgona-1,3,5(10),8-tetraen-17$\beta$-ol, 60.0 g., is dissolved in 1.2 l. of benzene and 200 ml. of hexane. The stirring solution is cooled in an ice-bath then 50.0 g. of anhydrous potassium carbonate and 43.0 g. of m-chloroperbenzoic acid are added. The solution is stirred at the low temperature for 15 minutes or until all of the per-acid is consumed. The ice-bath is removed then stirring is continued at room temperature for 45 minutes. The reaction is quenched by the addition of 1 liter of 5% potassium carbonate solution and the resulting white crystalline solid is filtered and dried to give 46.0 g. of the product. A further quantity of the title product is obtained from the organic extract after washing; drying (anhydrous sodium sulfate), filtering and removing the solvents in vacuo. The resulting oil upon trituration with benzene affords 11.5 g. more of the product. An analytical sample is obtained by recrystallization from benzene to give a white crystalline solid; M.P. 134–136° C.; $[\alpha]_D^{25}$ —22° (c.=1, dioxane);

$\lambda_{max.}^{KBr}$ 3.0$\mu$; $\lambda_{max.}^{EtOH}$ 258 m$\mu$ ($\epsilon$ 16,450)

Calcd. for $C_{19}H_{24}O_3$: C, 75.97; H, 8.07. Found: C, 75.93; H, 8.19.

EXAMPLE XVII d-3-methoxy-13-methylgona-1,3,5(10),6,8-pentaen-17β-ol and d - 3 - methoxy - 13 - methylgona-1,3,5(10),8,14-pentaen-17β-ol d - 3 - methoxy - 13 - methylgona - 1,3,5(10),9(11)-tetraene-8-17β-diol, 2.00 g., is dissolved in boiling methanol (30 ml.) then 10% hydrochloric acid (7 ml.) is added. Boiling is continued for 10 minutes then the solution is cooled and 100 ml. of water is added. The mixture is extracted with ether, the extract washed with water and saturated sodium chloride solution then dried over anhydrous sodium sulfate. The filtered solution is evaporated in vacuo to give a yellow oil. The oil is triturated with isopropanol to initiate crystallization. The solid is filtered to give 0.72 g. of off-white solid identified as the mixture of the title products.

EXAMPLE XVIII d-3-methoxy-13-methylgona-1,3,5-(10),6,8-pentaen-17-one

A mixture of d-3-methoxy-13-methylgona-1,3,5(10), 6,8-pentaen-17β-ol and d-3-methoxy-13-methylgona-1,3, 5(10),8,14-pentaen-17β-ol, 0.72 g., is dissolved in 50 ml. of acetone and treated dropwise and with stirring with 8 N chromic acid until a permanent reddish color indicates that an excess of the oxidant is present. The excess oxidant is decomposed by adding 10 ml. of isopropanol and 150 ml. of water. The mixture is extracted with ether and the extract washed with aqueous sodium bicarbonate, with water and with saturated sodium chloride solution then dried over anhydrous sodium sulfate. The solution is filtered and the solvents removed in vacuo to give an orange oil. Trituration of the oil with methanol and filtration affords 0.20 g. of the crude title product as orange plates; M.P. 190–194° C. The sample is further purified by passing a benzene solution through a column of 10% silver nitrate impregnated alumina (neutral, grade I). Removel of the benzene in vacuo and treatment of the residue in methylene chloride with decolorizing charcoal, filtration through filter aid and replacement of the methylene chloride with isopropanol by boiling affords upon standing, white needles of the pure compound; M.P. 197–199° C.; $[\alpha]_D^{24}$ +64° (c.=1, chf.);

$\lambda_{max}^{KBr}$ 5.80$\mu$

EXAMPLE XIX dl-8-hydroxy-3-methoxy-13-methylgona-1,3,5(10),9(11)-tetraen-17-one dl-3-methoxy - 13 - methylgona-1,3,5(10),8-tetraen-17-one, 30.0 g., is dissolved in 500 ml. of benzene and 100 ml. of hexane and cooled with an ice-bath. To the cooled, stirred solution is added 30.0 g. of potassium carbonate and 21.6 g. of m-chloroperbenzoic acid (21.6 g.) and stirring is continued for 30 minutes. The ice-bath is removed and the reaction is stirred for 2 hours more at room temperature then 1 liter of a 5% potassium carbonate solution is added. The mixture is diluted with ethyl acetate and the organic layer washed with 5% potassium carbonate solution, water and saturated sodium chloride solution; then dried over anhydrous sodium sulfate. The solution is filtered and the solvents removed in vacuo to give a yellow oil. The oil is dissolved in ether and let stand to complete crystallization. Filtration gives 20.0 g. of the product as a white crystalline solid; M.P. 144–147° C. The analytical sample (from ether) has M.P. 148–150° C.;

$\lambda_{max.}^{KBr}$ 2.90 and 5.75$\mu$; $\lambda_{max.}^{EtOH}$ 259 m$\mu$ ($\epsilon$ 17,400)

Calcd. for $C_{19}H_{22}O_3$: C, 76.48; H, 7.43. Found: C, 76.58; H, 7.39.

EXAMPLE XX dl-3-methoxy-13-methylgona-1,3,5(10),6,8-pentaen-17-one dl-8-hydroxy - 3 - methoxy - 13 - methylgona-1,3,5 (10),9(11)-tetraen-17-one, 20.0 g., is dissolved in 250 ml. of boiling methanol then 20 ml. of 10% hydrochloric acid is added. The solution is stirred for one hour then the off-white crystalline solid is filtered to give 15.2 g. of crude product. The solid is further purified by trituration with ether and filtration followed by trituration with tetrahydrofuran and filtration to give 6.70 g. of nearly pure product as a white crystalline solid. The solid in boiling tetrahydrofuran solution is treated with decolorizing charcoal, filtered through filter aid and the solvent replaced with isopropanol. On standing, the pure title product is deposited as shiny plates; M.P. 188–190° C.;

$\lambda_{max.}^{KBr}$ 5.79$\mu$.

EXAMPLE XXI dl-8-hydroxy-3-methoxy-13-ethylgona-1,3,5(10),9(11)-tetraen-17-one dl-8,9-epoxy-3-methoxy-13-ethylgona - 1,3,5(10)-trien-17-one, 5.00 g., is dissolved in 100 ml. of chloroform. Benzoic acid, 3.0 g., is added and the solution is stirred at room temperature of 18 hours. The chloroform is removed in vacuo and the residue dissolved in ether-ethyl acetate. The extract is washed with saturated sodium bicarbonate solution, with water and with saturated sodium chloride solution, then dried over anhydrous sodium sulfate. The solution is filtered and the solvents removed in vacuo. The resulting yellow oil is dissolved in ether and allowed to crystallize. Filtration gives 3.00 g. of the pure product; M.P. 118–121° C.;

$\lambda_{ma}^{KB}$ 2.90 and 5.80$\mu$; $\lambda_{max.}^{EtOH}$ 258 m$\mu$ ($\epsilon$ 17,600)

Calcd. for $C_{20}H_{24}O_3$: C, 76.89; H, 7.74. Found: C, 76.89; H, 7.47.

EXAMPLE XXII dl - 3 - methoxy-13-ethylgona-1,3,5(10),6,8-pentaen-17-one and dl-3-methoxy - 13 - ethylgona-1,3,5(10),8-14-pentaen-17-one dl-8-hydroxy - 3 - methoxy - 13 - ethylgona-1,3,5(10), 9(11)-tetraen-17-one, 0.61 g., is dissolved in 10 ml. of hot methanol then 0.5 ml. of concentrated hydrochloric acid is added to the warm solution. A few drops of ether are added as the solution cools to remove cloudiness. The resulting prisms are filtered to give 0.27 g. of dl-3-methoxy - 13 - ethylgona-1,3,5(10),6,8-pentaen-17-one; M.P. 160–165° C. The second crop of 0.21 g. is dl-3-methoxy - 13 - ethylgona-1,3,5(10),8,14-pentaen-17-one; M.P. 90–95° C.

EXAMPLE XXIII

Employing the general procedure described in Examples I–IX, XIV and XV the following 17-substituted-13-alkylgona-1,3,5(10),8-tetraenes (I) are oxidized to the corresponding 17-substituted-13-alkyl-8,9-epoxygona-1,3, 5(10)-trienes (II) which are then converted by treatment with mineral acid to the hereinafter listed isomeric mixtures which consist of a 17-substituted-13-alkylgona-1,3, 5(10),6,8-pentaene (III) and a 17-substituted-13-alkyl-gona-1,3,5(10)-8,14-pentaene (IV):

13β-methyl-3-cyclopentyloxygona-1,3,5(10),9(11)-tetraene-8,17β-diol.

| Starting Material (I) | Epoxide (II) | Products (III), (IV) |
|---|---|---|
| 3-hydroxy-13β-methylgona-1,3,5(10),8-tetren-17-ol. | 8,9-epoxido-3-hydroxy-13β-methylgona-1,3,5(10)-trien-17-ol. | 3-hydroxy-13β-methylgona-1,3,5(10),6,8-pentaen-17-ol and 3-hydroxy-13β-methylgona-1,3,5(10),8,14-pentaen-17-ol. |
| 13β-ethyl-2-hydroxygona-1,3,5(10),8-tetraen-17-ol. | 8,9-epoxido-13β-ethyl-2-hydroxygona-1,3,5(10)-trien-17-ol- | 13β-ethyl-2-hydroxygona-1,3,5(10),6,8-pentaen-17-ol and 13β-ethyl-2-hydroxygona-1,3,5(10,8,14-pentaen-17-ol. |
| 3,17-diacetoxy-13β-methylgona-1,3,5(10),-8-tetraene. | 3,17-diacetoxy-8,9-epoxy-13β-methylgona-1,3,5(10)-triene. | 3,17-diacetoxy-13β-methylgona-1,3,5(10)-6,8-pentaene and 3,17-diacetoxy-13β-methylgona-1,3,5(10)-8,14-pentaene. |
| 1,17-dibutyroyloxy-13β-methylgona-1,3,5(10),8-tetraene. | 1,17-dibutyroyloxy-8,9-epoxy-13β-methylgona-1,3,5(10)-triene. | 1,17-dibutyroyloxy-13β-methylgona-1,3,5(10)-6,8-pentaene and 1,17-dibutyroyloxy-13-β-methylgona-1,3,5(10),8,-14-pentaene. |
| 3,17-dimethoxy-13β-methylgona-1,3,5(10)-8-tetraene. | 3,17-dimethoxy-8,9-epoxy-13β-methylgona-1,3,5(10)-triene. | 3,17-dimethoxy-13β-methylgona-1,3,5(10),6,8-pentaene and 3,17-dimethoxy-13β-methyl-gona-1,-3,5(10),8,14-pentaene. |
| 3,17-ditetrahydropyranoxy-13β-methylgona-1,3,5(10),-8-tetraene. | 3,17-ditetrahydropyranoxy-8,9-epoxy-13β-methyl-gona-1,3,5(10)-triene. | 13β-methylgona-1,3,5(10)-6,8-pentaene-3,17-diol and 13β-methylgona-1,3,5(10),8,14-pentaene-3-17-diol- |
| 13β-methyl-3-cyclopentyloxy-gona-1,3,5(10),8-tetraen-17β-ol. | 8,9-epoxy-13β-methyl-3-cyclopentyloxygona-1,3,-5(10)-trien-17β-ol. | 13β-methyl-3-cyclopentyl-oxygona-1,3,5(10),6,8-pentaen17-β-ol and 13β-methyl-3-cyclopentyloxy-gona-1,3,5(10),8,14-pentaen-17β-ol. |

EXAMPLE XXIV dl-8,9-epoxy - 3 - methoxy - 13 - ethylgona-1,3,5(10)-trien-17-one is rearranged by the procedure of Example XXI to d,l-8-hydroxy-3-methoxy-13-ethylgona-1,3,5(10), 9(11)-tetraen-17-one, using instead of benzoic acid, stoichiometrically-equivalent amounts of the following mild organic carboxylic acids; meta-chlorobenzoic acid, furoic acid, 2-chloro-5-nitrobenzoic acid and 2,4-dinitrobenzoic acid. Substantially the same results are obtained.

The general procedures of Examples XVI, XIX and XXI are used to convert either the 1,3,5(10),8-tetraenes (I) or the 8,9-epoxy steroids (II) of Examples IX and XXIII to the following 8-hydroxy-9(11)-rearrangement products (IIa, in the case of the starting materials with deactivating substituents, such as 3-acetoxy, in the A-ring of the starting material, best results are obtained with the stronger mild organic carboxylic acids mentioned above, especially, 2,4-dinitrobenzoic acid):

13β-methylgona-1,3,5(10),9(11)-tetraene-3,8-diol-17-one;
13β-ethylgona-1,3,5(10),9(11)-tetraene-2,8-diol-17-one;
3-acetoxy-13β-methylgona-1,3,5(10),9(11)-tetraen-8-ol-17-one;
1-butyroyloxy-13β-methylgona-1,3,5(10),9(11)-tetraen-8-ol-17-one;
13β-ethyl-3-propionoyloxygona-1,3,5(10),9(11)-tetraen-8-ol-17-one;
13β-methylgona-1,3,5(10),9(11)-tetraene-3,8,17-triol;
13β-ethylgona-1,3,5(10),9(11)-tetraene-2,8,17-triol;
3,17-diacetoxy-13β-methylgona-1,3,5(10),9(11)-tetraen-8-ol;
1,17-dibutyroyloxy-13β-methylgona-1,3,5(10),9(11)-tetraen-8-ol;
3,17-dimethoxy-13β-methylgona-1,3,5(10),9(11)-tetraen-8-ol;
3,17-ditetrahydropyranyloxy-13β-methylgona-1,3,5(10),9(11)-tetraen-8-ol;
13β-ethyl-3-cyclopentyloxy-8-hydroxygona-1,3,5(10),9(11)-tetraen-17-one; and Heating these with acid under the conditions described in Example XI provides the corresponding products of Formulae III and IV.

EXAMPLE XXV 17,17 - ethylenedioxy - 3 - methoxy - 13β - methylgona-1,3,5(10),8-tetraene is treated with meta-chloroperbenzoic acid according to the procedure of Example I and there is obtained 8,9-epoxido-17,17-ethylenedioxy-3-methoxy-13β-methylgona-1,3,5(10)-triene, which is treated with benzoic acid according to the procedure of Example XXI and there is obtained 17,17-ethylenedioxy-8-hydroxy-3-methoxy-13β-methylgona-1,3,5(10),9(11)-tetraene. This is treated with hydrochloric acid according to the procedure of Example XXII and there are obtained 3-methoxy-13β-methylgona-1,3,5(10),6,8-pentaen-17-one and 3-methoxy-13β-methylgona-1,3,5(10),8,14-pentaen-17-one.

8,9 - epoxido - 17,17 - ethylenedioxy - 3 - methoxy-13β-methylgona-1,3,5(10)-triene is treated with hydrochloric acid by the procdure of Example XXII and there are obtained 3 - methoxy-13β-methylgona-1,3,5(10),6,8-pentaen-17-one and 3 - methoxy-13β-methylgona-1,3,5(10),-8,14-pentaen-17-one.

What is claimed is:

1. A process for the preparation of a gonapentaene steroid of the formula

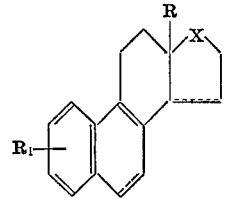

which contains a fifth double bond at either position indicated by the broken lines and wherein R is lower alkyl; $R_1$ is hydrogen, hydroxy, lower alkoxy, lower cycloalkoxy, lower alkyl or lower alkanoyloxy and X is keto, hydroxymethylene, lower alkoxymethylene or lower alkanoyloxy methylene which comprises (a) reacting a tetraene steroid of the formula:

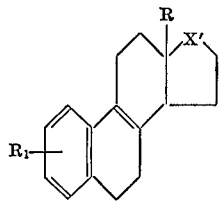

wherein R and $R_1$ are defined as above, and X' is keto, hydroxymethylene, lower alkoxymethylene, lower alkanoyloxymethylene or lower alkylenedioxymethylene, with a peroxycarboxylic acid, in a reaction-inert organic solvent, said reaction being conducted at a temperature range from about $-10°$ C. to about $10°$ C. for a period of from about five minutes to about two hours, to form an epoxidized steroid of the formula:

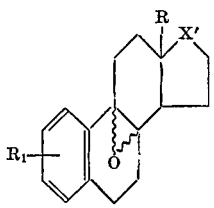

wherein R, $R_1$ and X' are defined as above, and (b) reacting said epoxide with an inorganic mineral acid, in a reaction-inert organic solvent, at a temperature of from about $20°$ C. to about $110°$ C. for a period of from about five minutes to about two hours.

2. A process as defined in claim 1 wherein, in step (a), said peroxycarboxylic acid is perphthalic acid, perbenzoic acid, metachloroperbenzoic acid or peracetic acid.

3. A process as defined in claim 1 wherein, in step (a), said reaction-inert organic solvent is a mixture of a liquid alkane and benzene or a mixture of a liquid alkane and toluene.

4. A process as defined in claim 1 wherein, in step (a), said reaction mixture contains a base selected from sodium carbonate, potassium carbonate, sodium bicarbonate or potassium bicarbonate.

5. A process as defined in claim 1 wherein, in said steroids, X is carbonyl.

6. A process as defined in claim 5 wherein the product of step (b) is isolated and separated by fractional crystallization into a gona-1,3,5(10),6,8-pentaen-17-one and a gona-1,3,5(10),8,14-pentaen-17-one.

7. A process as defined in claim 1 wherein, in said steroids, X is hydroxymethylene.

8. A process as defined in claim 4 wherein, in step (a), the peroxycarboxylic acid employed is metachloroperbenzoic acid; the solvent mixture employed is hexane-benzene; and the base employed is selected from potassium carbonate or potassium bicarbonate; and, in step (b) the inorganic mineral acid employed is hydrochloric acid; and the reaction-inert organic solvent employed is an alkanol.

9. A process as defined in claim 4 for the preparation of 3 - methoxy-13β-methylgona-1,3,5(10),6,8-pentaen-17-one and 3-methoxy-13β-methylgona-1,3,5(10),8,14-pentaen-17-one which comprises:

(a) reacting 3 - methoxy-13β-methylgona-1,3,5(10),8-tetraen-17-one with metachloroperbenzoic acid, in a hexane-benzene solvent mixture, in the presence of potassium carbonate, said reaction being conducted at a temperature of about $0°$ C. for a period of about fifteen minutes, to form 8,9-epoxy-3-methoxy-13β-methylgona-1,3,5(10)-trien-17-one; and (b) reacting said epoxide with hydrochloric acid in warm methanol for about one hour.

10. A process as defined in claim 4 for the preparation of 13β-ethyl-3-methoxygona-1,3,5(10),6,8-pentaen-17-one and 13β-ethyl-3-methoxygona-1,3,5(10),8,14-pentaen-17-one which comprises:

(a) reacting 13β-ethyl - 3 - methoxygona-1,3,5(10),8-tetraen-17-one with metachloroperbenzoic acid, in a hexane-benzene solvent mixture, in the presence of potassium carbonate, said reaction being conducted at a temperature of about $0°$ C. for a period of about fifteen minutes, to form 8,9-epoxy-13β-ethyl-3-methoxygona-1,3,5(10)-trien-17-one; and (b) reacting said epoxide with hydrochloric acid in warm methanol for about one hour.

11. A process as defined in claim 1 including the steps of treating the mixture from step (a) with a mild organic carboxylic acid to form an 8-hydroxy steroid of the formula

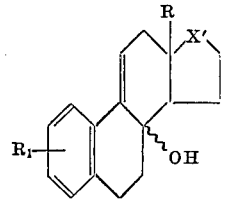

wherein R, $R_1$ and X' are as defined therein and isolating said 8-hydroxy steroid.

12. A process as defined in claim 11 wherein said mild organic carboxylic acid is benzoic acid, meta-chlorobenzoic acid, furoic acid, 2-chloro-5-nitrobenzoic acid or 2,4-dinitrobenzoic acid.

13. A process as defined by claim 11 including the step of reacting said 8-hydroxy steroid with an inorganic mineral acid, in a reaction-inert organic solvent, at a temperature of from about $20°$ C. to about $110°$ C. for a period of from about five minutes to about 5 hours and recovering the gonapentaene prepared thereby.

No references cited.

HENRY A. FRENCH, Primary Examiner

U.S. Cl. X.R.

260—239.55, 397.3, 397.5, 999